United States Patent
Petri et al.

(10) Patent No.: US 9,092,740 B2
(45) Date of Patent: Jul. 28, 2015

(54) CONCEPT NOISE REDUCTION IN DEEP QUESTION ANSWERING SYSTEMS

(71) Applicant: International Business Machines Corporation, Armonk, NY (US)

(72) Inventors: John E. Petri, St. Charles, MN (US); Richard J. Stevens, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 280 days.

(21) Appl. No.: 13/671,810

(22) Filed: Nov. 8, 2012

(65) Prior Publication Data

US 2014/0129492 A1    May 8, 2014

(51) Int. Cl.
| | | |
|---|---|---|
| *G06F 15/18* | (2006.01) | |
| *G06F 17/00* | (2006.01) | |
| *G06N 5/04* | (2006.01) | |
| *G06N 99/00* | (2010.01) | |
| *G09B 19/00* | (2006.01) | |

(52) U.S. Cl.
CPC .......... *G06N 99/005* (2013.01); *G09B 19/0053* (2013.01)

(58) Field of Classification Search
None
See application file for complete search history.

(56) References Cited

U.S. PATENT DOCUMENTS

| | | | | |
|---|---|---|---|---|
| 6,076,088 | A * | 6/2000 | Paik et al. ............................. | 1/1 |
| 7,809,717 | B1 * | 10/2010 | Hoeber et al. ................ | 707/722 |
| 8,051,080 | B2 | 11/2011 | Kraft et al. | |
| 2004/0117352 | A1 | 6/2004 | Schabes et al. | |
| 2009/0287678 | A1 * | 11/2009 | Brown et al. ..................... | 707/5 |
| 2009/0292687 | A1 * | 11/2009 | Fan et al. .......................... | 707/5 |
| 2011/0016130 | A1 | 1/2011 | Wennerberg et al. | |
| 2011/0066587 | A1 * | 3/2011 | Ferrucci et al. ................. | 706/54 |
| 2014/0127647 | A1 | 5/2014 | Petri et al. | |

OTHER PUBLICATIONS

Dredze, Mark, Koby Crammer, and Fernando Pereira. "Confidence-weighted linear classification." Proceedings of the 25th international conference on Machine learning. ACM, 2008.*

Ferrucci, David, et al. "Building Watson: An overview of the DeepQA project." AI magazine 31.3 (2010): 59-79.*

Hartrumpf, Sven. "Semantic Decomposition for Question Answering." ECAI. 2008.*

(Continued)

*Primary Examiner* — Kakali Chaki
*Assistant Examiner* — Daniel Pellett
(74) *Attorney, Agent, or Firm* — Patterson & Sheridan, LLP

(57) ABSTRACT

Method, computer program product, and system to perform an operation for a deep question answering system. The operation begins by computing a concept score for a first concept in a first case received by the deep question answering system, the concept score being based on a machine learning concept model for the first concept. The operation then excludes the first concept from consideration when analyzing a candidate answer and an item of supporting evidence to generate a response to the first case upon determining that the concept score does not exceed a predefined concept minimum weight threshold. The operation then increases a weight applied to the first concept when analyzing the candidate answer and the item of supporting evidence to generate the response to the first case when the concept score exceeds a predefined maximum weight threshold.

16 Claims, 4 Drawing Sheets

(56) References Cited

OTHER PUBLICATIONS

Ittycheriah, Abraham, et al. "IBM's Statistical Question Answering System."TREC. 2000.*

Magnini, Bernardo, Manuela Speranza, and Vikash Kumar. "Towards interactive question answering: an ontology-based approach." Semantic Computing, 2009. ICSC'09. IEEE International Conference on. IEEE, 2009.*

* cited by examiner

CONCEPT NOISE REDUCTION IN DEEP QUESTION ANSWERING SYSTEMS

BACKGROUND

Embodiments disclosed herein relate to deep question answering systems. More specifically, embodiments disclosed herein relate to reducing concept "noise" in deep question answering systems.

In deep question answering systems (Deep QA), like IBM's Watson®, analysis programs are used to identify ontological information (i.e., concepts and their relationships within a domain) in both the question being posed and in one or more candidate answers. For example, an analysis program may identify medical concepts with the aid of a specific medical ontology or knowledge base. When determining the correct answer, the system employs algorithms which attempt to match concepts from a given candidate answer to concepts contained in the question. These algorithms produce scores which are used by the Deep QA system to help it choose the correct answer with the highest degree of confidence.

However, it is currently very difficult to identify and reduce noise when matching and scoring concepts. A meaningless or noisy concept is one that is often identified in a candidate answer, but rarely matches to meaningful concepts in the question. Alternatively, a concept may be found to match concepts in the question, but does not contribute towards increasing confidence that an answer is correct or incorrect. This type of noise brings down the overall concept matching score for the candidate answer, and can ultimately result in the incorrect answer being chosen.

Inverse document frequency (IDF) scores have been used in current solutions in an attempt to identify the most significant or impactful terms in a document or collection of documents. IDF assigns higher scores to terms appearing less frequently. This approach is often useful, but does not always filter out noise, as low frequency terms are not necessarily significant when it comes to predicting right or wrong answers.

SUMMARY

Embodiments disclosed herein provide a computer-implemented method, computer program product, and system to perform an operation for a deep question answering system. The operation begins by computing a concept score for a first concept in a first case received by the deep question answering system, the concept score being based on a machine learning concept model for the first concept. The operation then excludes the first concept from consideration when analyzing a candidate answer and an item of supporting evidence to generate a response to the first case upon determining that the concept score does not exceed a predefined concept minimum weight threshold. The operation then increases a weight applied to the first concept when analyzing the candidate answer and the item of supporting evidence to generate the response to the first case when the concept score exceeds a predefined maximum weight threshold.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
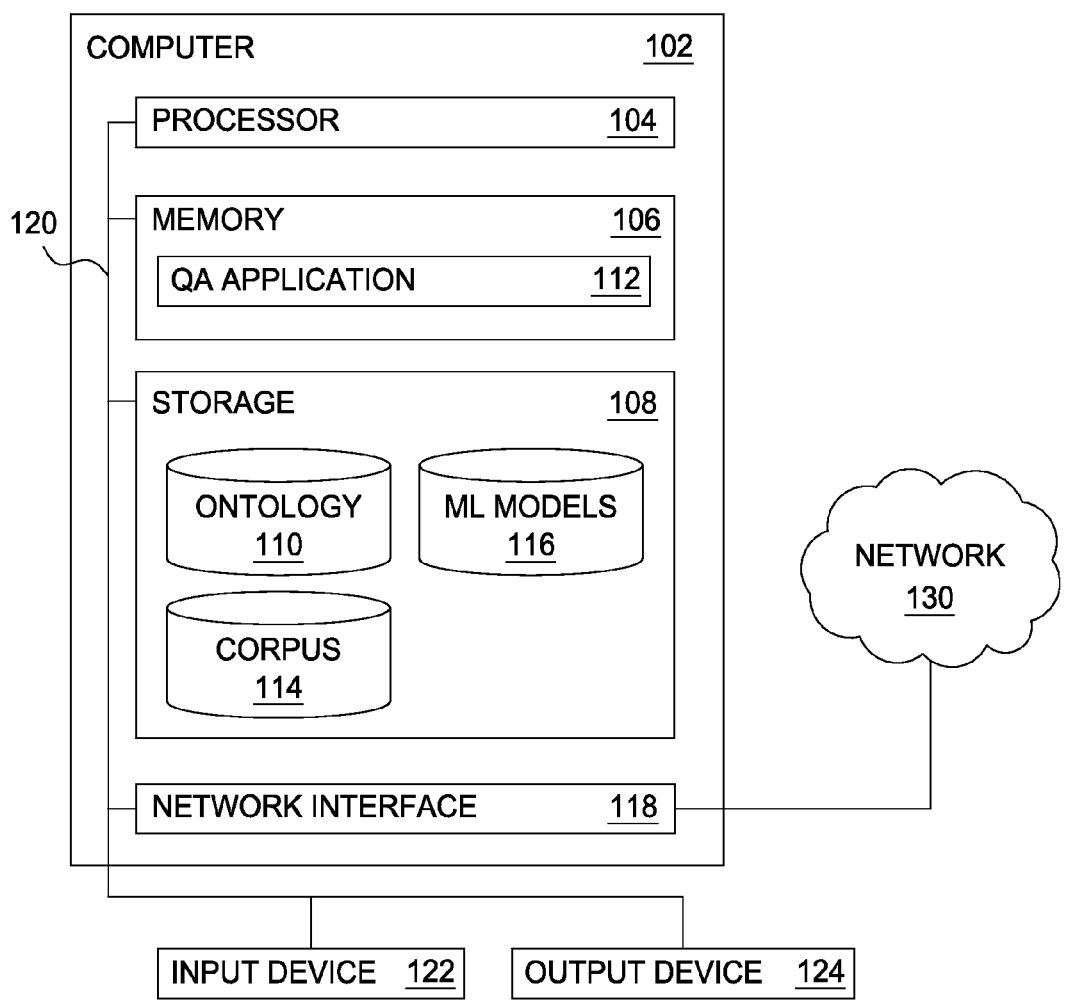
FIG. 1 is a block diagram illustrating a system for concept noise reduction in deep question answering systems, according to one embodiment disclosed herein.

Embodiments disclosed herein intelligently reduce or eliminate noise when matching and scoring concepts in a deep question answering (Deep QA) system, improving the accuracy and confidence of the system's answer. The Deep QA system is initially trained against a sample case (or cases) in order to produce a machine learning (ML) model. The ML model assigns weights to the systems' various analysis programs according to how well they predict correct answers to the case. The ML approach is then applied at the concept level to further improve accuracy. Therefore, after the system has been trained, there will be an additional ML model, the concept ML model, which is used at runtime to reduce or eliminate concept noise and improve scoring accuracy.

In creating the concept ML model, embodiments disclosed herein use concept matching as a technique to establish the degree of relevancy for a candidate answer to a given question, or for a piece of supporting evidence to a question/candidate answer pair. Concept matching involves detecting a set of domain specific concepts within both the question and the item being evaluated for relevancy (either a candidate answer or a supporting evidence article), then computing a relevancy score based on the presence of matching concepts in the question/candidate answer pair, or the presence of relationships between concepts in the question and those within the candidate answer being evaluated.

An example of a type of concept relationship may be a specialization relationship where one concept can be viewed as a more specialized instance of another. For example, "adenocarcinoma" may be a more specific type of the concept "cancer." A highly relevant article or candidate answer may have a higher degree of congruence with the concepts and related concepts within the question. The relevancy score computed in this manner may be combined with overall sentiment to arrive at a feature score that may be used to rank candidate answers and establish confidence in those answers. Sentiment may refer to the overall positive or negative statement made in one set of information about another. Sentiment may be important when evaluating how supportive a piece of supporting evidence is of a given candidate answer. Furthermore, the combination of relevance and sentiment are important to consider. Embodiments disclosed herein may find highly relevant articles and combine them with sentiment to arrive at a view of how much a given article supports a candidate hypothesis. For example, an article may talk about a given treatment in light of patients that are very similar to the current patient. If the article goes on to say patients had diminished life expectancy, the article may be labeled as having negative sentiment. If the article goes on to say patients using the treatment were cured, the sentiment of the article may be positive. It may be desirable for a highly relevant candidate answer or supporting evidence article to carry more weight in this determination, e.g., a highly relevant article that indicates a given cancer treatment has been proven to be effective may carry more weight than a less relevant article relative to the same question and/or candidate answer.

Concept matching may be applied in any domain for which there is a bounded ontology or defined set of concepts. In healthcare, the Unified Medical Language System (UMLS) has been used for this purpose. UMLS identifies a wide range of concepts which apply in the field of healthcare, including synonymous ways of expressing the same concept, a semantic type system over the concepts, and various type relationships which exist between concepts. A problem with using ontologies like UMLS for concept matching may be that some of the concepts defined within the ontology may be useful for establishing relevancy, while others contribute no value to the relevancy determination. This latter set of concepts may be referred to as "noise." For example, temporal concepts defined within UMLS include the terms "year" and "old." The term "found" is a sign or symptom concept also defined in UMLS. None of these concepts are very useful for establishing relevancy to most classes of questions. Therefore, in those cases, it may be desirable to remove these "noisy" concepts from the concept matching algorithm in order to minimize their effect.

Determining which concepts to exclude from matching and how to weight various types of relationships between concepts has heretofore been a manual, experiment driven process. Embodiments disclosed herein utilize machine learning to determine, statistically, how well a given concept contributes to our understanding of relevancy. The features used for this purpose may include the concepts and concept relationships within a given ontology. Concept matching scores may be computed to reflect whether matching concepts were found in question and candidate answers or supporting evidence, or whether specific related concepts were found between questions and candidate answers or supporting evidence.

An answer key may be used during the machine learning process to indicate whether a given candidate answer or supporting passage was relevant or not relevant to a given question. The model produced through the machine learning process may define how to weight each concept and each concept relationship, such that those concepts that are good predictors of relevancy are weighted highly, and those that are poor predictors are weighted lower. These weights may be used to aggregate a set of concept and concept relationship scores into a single relevancy score, or to filter out those concepts that fall below a given threshold, as defined by the machine learning model. Both approaches result in noisy concepts having little or no impact where overall relevancy is determined based on the concept matching approach. Accordingly, approaches are disclosed herein for reducing the presence of noisy concepts.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access a deep question answering system or related data available in the cloud. For example, the deep question answering system could execute on a computing system in the cloud and score concept relevance in an effort to reduce the number of irrelevant concepts used in answering questions. In such a case, the deep question answering system could score different concepts and store the concept scores at a storage location in the cloud. Doing so allows a user to access this information from any computing system attached to a network connected to the cloud (e.g., the Internet).

FIG. 1 is a block diagram illustrating a system 100 for concept noise reduction in deep question answering systems, according to one embodiment disclosed herein. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

As shown, the memory 106 contains the QA application 112, which is an application generally configured to operate a deep question answering (QA) system. One example of a deep question answering system is Watson, by the IBM Corporation of Armonk, N.Y. A user may submit a case (also referred to as a question) to the QA application 112, which will then provide an answer to the case based on an analysis of a corpus of information. The QA application 112 may analyze the questions presented in the case to identify concepts in the question. Based on the questions, the QA application 112 may identify a number of candidate answers. The QA application 112 may then find supporting evidence for the candidate answers. The QA application 112 may then score and rank the candidate answers, merge the results, and present the best answer as its response to the case. Additionally, the QA application 112 may be trained to identify concepts which are particularly relevant (or irrelevant) in answering particular types of questions. Based on this machine learning, the QA application 112 may, when presented a case at runtime, identify and score concepts in the case which are relevant or irrelevant. Upon scoring the concepts, the QA application 112 may place extra weight on relevant concepts and discard concepts identified as irrelevant in returning a response/answer to the case.

As shown, storage 108 contains the ontology 110, which provides a structural framework for organizing information. An ontology formally represents knowledge as a set of concepts within a domain, and the relationships between those concepts. The storage 108 also includes a corpus 114, which is a body of information used by the QA application 112 to generate answers to cases. For example, the corpus 114 may contain scholarly articles, dictionary definitions, encyclopedia references, and the like. Additionally, the storage 108 includes machine learning (ML) models 116, which are models created by the QA application 112 to reduce or eliminate concept noise and improve scoring accuracy. Although depicted as a database, the ontology 110, corpus 114, and ML models 116 may take any form sufficient to store data, including text files, xml data files, and the like. In one embodiment, the ontology 110 is part of the corpus 114. Although depicted as residing on the same computer, any combination of the QA application 112, the ontology 110, corpus 114, and ML models 116 may reside on the same or different computers.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

Figure 2:
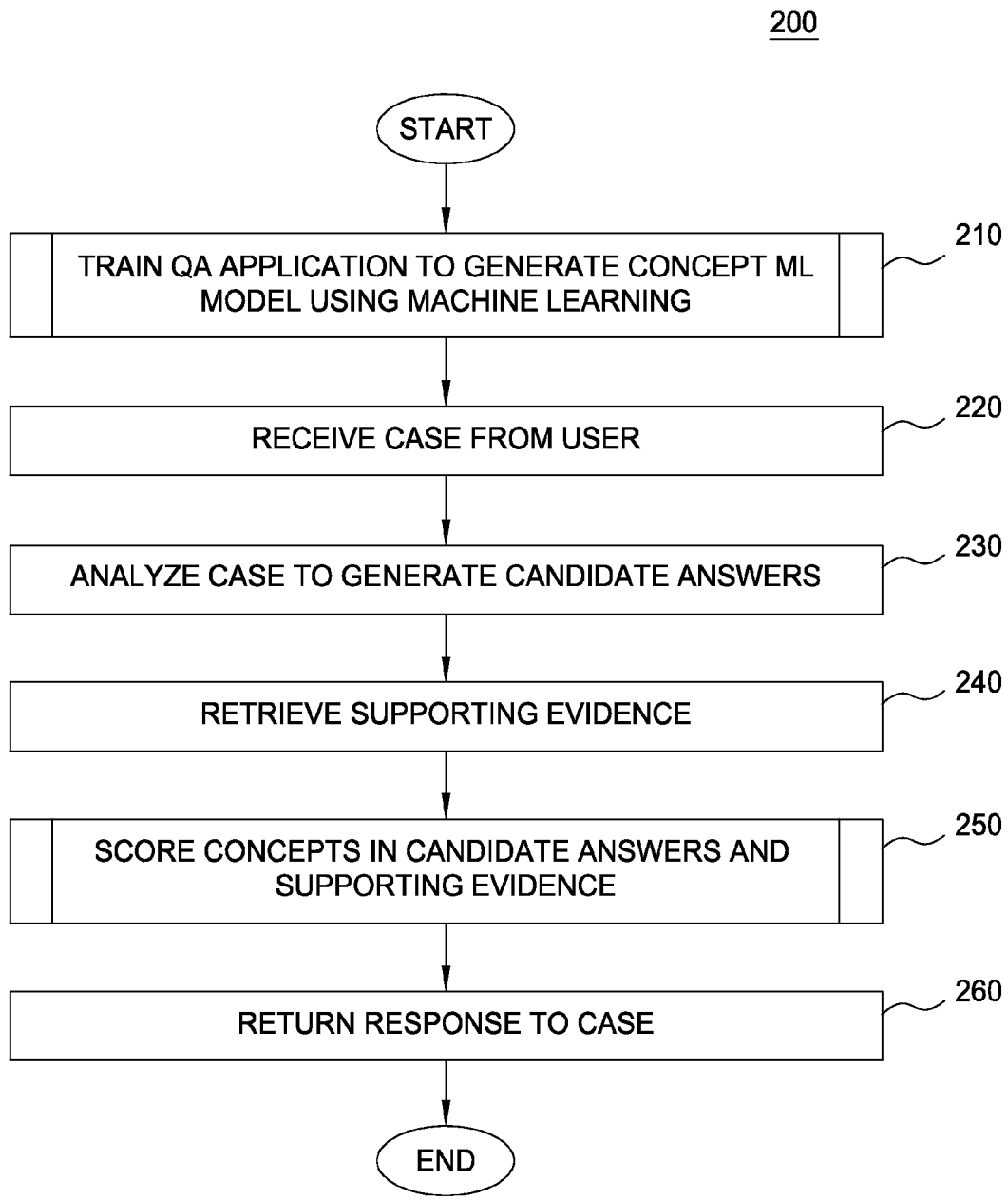
FIG. 2 is a flow chart illustrating a method for concept noise reduction in deep question answering systems, according to one embodiment disclosed herein.

FIG. 2 is a flow chart illustrating a method 200 for concept noise reduction in deep question answering systems, according to one embodiment disclosed herein. Generally, the method 200 implements techniques to reduce the number of irrelevant concepts analyzed in generating a response to a case presented to a deep question answering (deep QA) system, such as the QA application 112. At step 210, the QA application 112 is trained to generate concept machine learning models using machine learning. When the QA application 112 is trained, a machine learning (ML) model is produced which assigns weights to the various analysis programs of the QA application 112 according to their ability to predict correct answers to the cases presented. The QA application 112 may apply this machine learning approach at the concept level to further improve accuracy. Therefore, after the QA application 112 is trained, there will be an additional ML model, a concept ML model, which is stored in the ML models 116 and used by the QA application 112 at runtime to reduce or eliminate concept noise and improve scoring accuracy. One embodiment of training a deep question answering system to generate a concept machine learning model using machine learning in step 210 is described in greater detail below with reference to FIG. 3.

At step 220, the QA application 112 receives a case from a user. The case may be a question, such as, "which university from North Carolina has the most basketball championships?" The case may also be a more complex, detailed scenario, such as a patient's medical information, history, and symptoms, which are provided to the QA application 112 with the expectation that the QA application 112 will provide an accurate diagnosis, recommend appropriate treatments, and the like. At step 230, the QA application 112 analyzes the case to generate candidate answers from the corpus 114. In one embodiment, the QA application 112 may identify concepts in the case to facilitate the generation of candidate answers. At step 240, the QA application 112 retrieves supporting evidence for the candidate answers from the corpus 114. At step 250, the QA application 112 scores concepts in the candidate answers and supporting evidence to apply the appropriate weight to the concepts in reaching a final answer. If the concept is particularly relevant in determining a correct answer to the question/case, the QA application 112 may weigh the concept accordingly. If the concept is not relevant, then the QA application 112 may ignore the concept. The scoring of concepts in step 250 is described in greater detail with reference to FIG. 4. In some embodiments, a case may have many questions, and the steps 230-250 of the method 200 must be performed for each question such that a correct answer for each question may be generated. At step 260, the QA application 112 returns a response to the case with the correct answers to each question.

Figure 3:
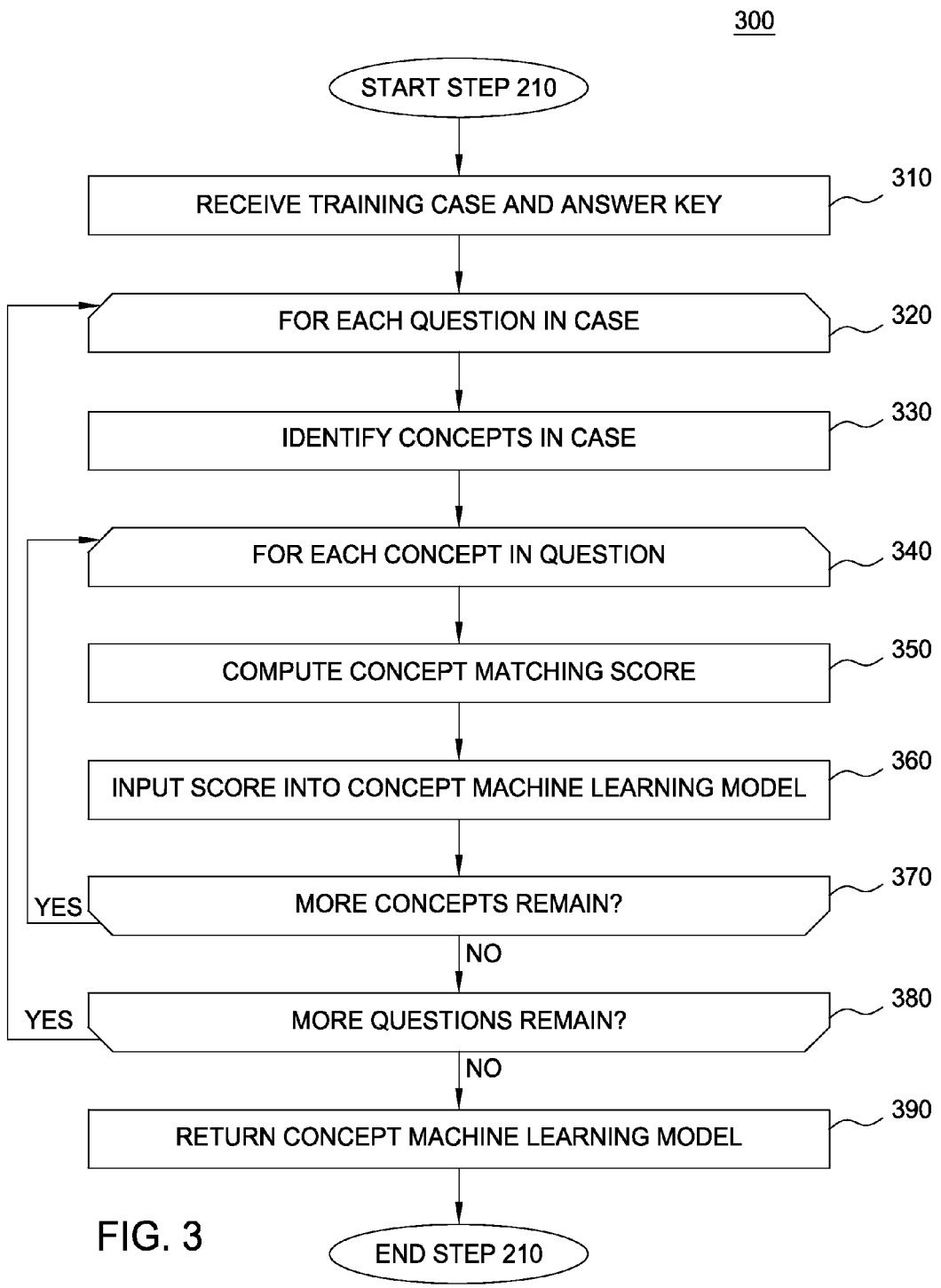
FIG. 3 is a flow chart illustrating a method to train a deep question answering system to generate a concept machine learning model using machine learning, according to one embodiment disclosed herein

FIG. 3 is a flow chart illustrating a method 300 corresponding to step 210 to train a deep question answering system to generate a concept machine learning model using machine learning, according to one embodiment disclosed herein. Generally, the method 300 includes providing the QA application 112 with enough training data, which, over time, allows the QA application 112 to produce appropriate weights for a given concept. In one embodiment, the QA application 112 performs the steps of the method 300. At step 310, the QA application 112 receives a training case and an answer key to the training case. The answer key may indicate the correct answers to the training case, and is used to train the QA application 112 to reach the correct answers. In one embodiment, the answer key may indicate one or more documents or articles in the corpus 114 which contain the correct answer to the training case.

At step 320, the QA application 112 executes a loop containing steps 330-380 for each question presented in the case. A case, which is the overall query submitted to the QA application 112, may be comprised of multiple questions, each of which may have several concepts. At step 330, the QA application 112 identifies the concepts in the case. In one embodiment, the QA application 112 may identify concepts by applying an ontology to the unstructured text of the question, candidate answer, or supporting evidence. Ontologies may define domain specific terms and synonyms for those terms. The set of terms and synonymous terms may be used to detect concepts which fall within the scope of the ontology in question. The QA application 112 may also use text analysis to identify the concepts in the case.

At step 340, the QA application 112 executes a loop containing steps 350-370 for each concept in the question. At step 350, the QA application 112 computes a concept matching score. The concept matching score may be computed based on the likelihood that the concept leads the QA application 112 to produce the correct answer as defined in the answer key. Concept matching scores reflect the extent to which a concept found in one place (e.g. the question) is also expressed within another (e.g. the candidate answer). A number of approaches may be used to arrive at a concept match score. In one embodiment, the QA application 112 may look for an exact match in concepts between the two sources in question. In another embodiment, the QA application 112 may assign partial scores based on existence of a related concept in the other source (e.g. a match score may be given, recognizing there is a relationship between Bevacizumab and chemotherapy drugs, such as Bevacizumab "is a" chemo drug). The concept matching score may be based on any scale suitable to indicate a range of scores. For example, the question may ask, "Who was the 10$^{th}$ president of the United States?" A concept labeled "U.S. Presidents" in the ontology 110 may lead to an ordered listing of U.S. presidents in the corpus 114, through which the QA application 112 may determine the correct answer. Based on such a scenario, the QA application 112 may compute a very high concept matching score for the concept "U.S. Presidents" when the question pertains to U.S. Presidents. Additionally, the QA application 112 may note the type (or class) of question that the concept was particularly effective at answering, as there may be other types of questions for which the concept "U.S. Presidents" may not be relevant for producing correct answers. The QA application 112 may include in a respective concept ML model a coefficient weighting the question class accordingly.

Expounding on this president example, a question may mention "George Washington," a candidate answer may mention "Abraham Lincoln," and the ontology recognizes the concept "U.S. Presidents." In such a scenario, both the question and candidate answer would contain an instance of that concept, but with different values for the concept. A concept matching algorithm may result in a low score, since the values for the concepts do not match. Embodiments disclosed herein determine how much weight to give to the fact that we did (or did not) match the "U.S. President" concept. If the question asked, "what currency is George Washington featured on?" the "U.S. President" concept may be heavily weighted, while another concept, such as "monetary value" would not.

At step 360, the computed concept matching score is inputted to the concept machine learning model. At step 370, the QA application 112 determines whether more concepts remain in the question. If more concepts remain, the QA application 112 returns to step 340. Otherwise, the QA application 112 proceeds to step 380. At step 380, the QA application 112 determines whether more questions remain in the case. If more questions remain, the QA application 112 returns to step 320. Otherwise, the QA application 112 proceeds to step 390. At step 390, the concept machine learning model is returned. In one embodiment, the concept machine learning model may be stored in the ML models 116, which may be used by the QA application 112 during runtime execution to reduce concept noise.

Figure 4:
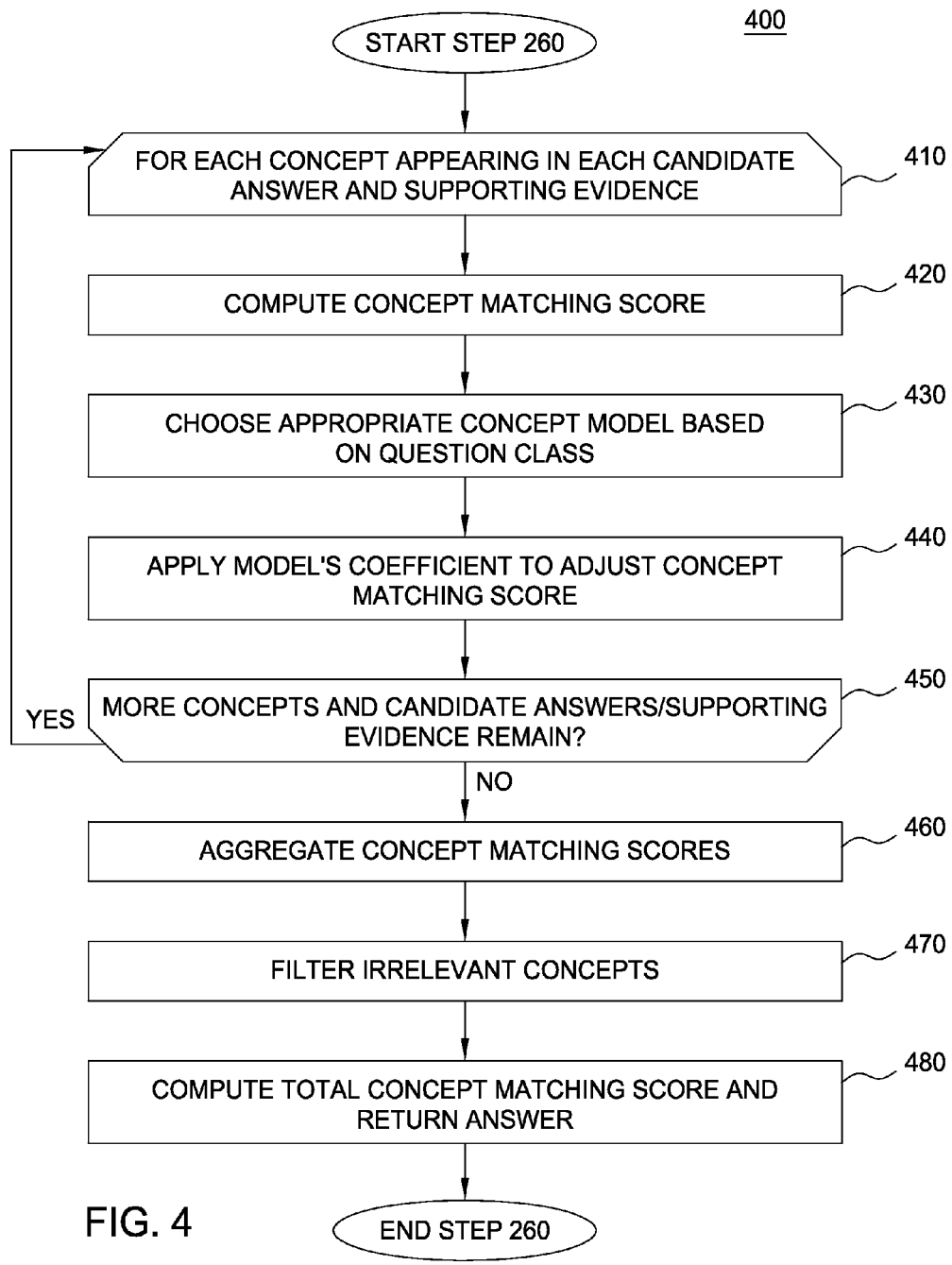
FIG. 4 is a flow chart illustrating a method to score concepts in candidate answers and supporting evidence, according to one embodiment disclosed herein.

FIG. 4 is a flow chart illustrating a method 400 corresponding to step 250 to score concepts in candidate answers and supporting evidence, according to one embodiment disclosed herein. Generally, the steps of the method 400 allow the QA application 112 to use the concept ML models at runtime to eliminate noisy concepts and place more emphasis on relevant concepts when producing a response to a case. In one embodiment, the QA application 112 performs the steps of the method 400. At step 410, the QA application 112 executes a loop including steps 420-450 for each concept appearing in each candidate answer and the supporting evidence for each candidate answer. At step 420, the QA application 112 computes a concept matching score for the current concept. In one embodiment, the concept matching score may be based on the QA application 112 determining that the concept is present in both the question and the candidate answer or supporting evidence. For example, if the concept "farming" is found in both the question and the candidate answer (or supporting evidence for the candidate answer), the QA application 112 may assign a concept matching score indicative of a high relevance to the concept of "farming." In another embodiment, the concept matching score may be based on the QA application 112 determining that concepts related to the concept were found between the question and the candidate answer or supporting evidence. For example, if the concept in the question is "farming," and the candidate answer or supporting evidence includes the concept "organic gardening," which is defined in the ontology 110 as being related to "farming," the QA application 112 may assign a concept matching score indicative of a high relevance to the concept of "organic gardening." Additionally, if the concept, or related concepts, are not found between the question and candidate answer/supporting evidence, the QA application 112 may assign a concept matching score indicative of a low relevance to the concept, such that it may not be considered when computing a final answer. In one embodiment, two concept matching scores for each concept may be produced. An exact match concept matching score may indicate that an exact match for the concept was found, while a related concept matching score may indicate that a related concept was found. The QA application 112 may look to the concept machine learning model to weigh these two scores, as the nature of the data used to train the machine learning model influences how much weight is applied to each of the two concept matching scores.

The QA application 112 may also consider directionality. In some cases, it may be important to consider which "side" (the question side or the candidate answer/evidence side) the concept falls on when scoring concepts. For example, the QA application 112 may receive a question asking whether a medical procedure is medically necessary from an insurance company to determine whether to pay for a procedure. If a case indicates that the patient has "breast cancer," and the appropriate answer (based on the company's policies, stored in the corpus) is that treatment for all types of "cancer" is medically necessary, then this should receive a very high score. However, if the case requires more specificity, such as where the case mentions "cancer," but the candidate answer mentions "breast cancer," then that should receive a low score indicating whether the procedure is medically necessary.

At step 430, the QA application 112 may choose the appropriate concept ML model based on the current question class. As stated above, during training, the QA application 112 includes the question class in computing the ML concept models, because a concept may be relevant for one type of question, but irrelevant for a large number of other classes of questions (or vice versa). Therefore, in the "farming" example given above, the concept model for farming questions may be chosen from the ML models 116. At step 440, the QA application 112 applies the model's coefficient to adjust the concept matching score. For example, if the "farming" concept model indicates that "organic gardening" should be weighted more heavily, the coefficient may be applied to increase the concept matching score for "organic gardening." Conversely, if the model indicates that "organic gardening" is not relevant, and should be ignored, the coefficient may be applied to further decrease the concept matching score for "organic gardening." Additionally, if "farming" returned a low concept score, but the ML concept model indicates that "farming" is an important concept in answering this class of question, the concept will be included for scoring the answer, as the concept matching score will be increased to reflect this importance.

At step 450, the QA application 112 determines whether more concepts and candidate answers or supporting evidence remain to be analyzed. If so, the QA application 112 returns to step 410. Otherwise, the QA application 112 proceeds to step 460. In one embodiment, at step 460, the QA application 112 may aggregate all concept matching scores into a single relevancy score. In one embodiment, the QA application 112 applies weighting factors to each concept matching score prior to aggregation. The weighting factors may be established by the machine learning concept model to reflect the overall significance and impact each concept has on establishing relevancy. In another embodiment, at step 470, the QA application 112 may filter out irrelevant concepts. For example, if the adjusted concept matching score falls below a predefined minimum concept relevance threshold, the concept may not be considered in reaching a final answer. Any concepts whose matching score is above this threshold may be considered important and should be included in scoring the candidate answer. In one embodiment, multiple overall relevance scores may be calculated using different threshold values in concept weight from the machine learning model. One relevancy score may then be computed, using just the concepts, with a model weight above, for example, 0.5, and another relevancy score may be computed using concepts with a model weight above 0.7. At step 480, the QA application 112 may compute the final score and return an answer to the case based on the computed concept matching scores. In one embodiment, a total concept matching score may be computed by summing the computed concept matching score of each concept, which may be used to determine an ultimate answer to the case. Additionally, the UL machine learning concept model may provide weights the QA application 112 may apply to each individual concept in determining the total concept matching score.

By training the QA application 112, it will produce appropriate weights for each concept. When each candidate answer is evaluated at runtime, the QA application 112 will take into account the concept's weight during answer scoring. If a concept is generally "meaningless," it will have a corresponding low weight, and thus, if there are no matches to the concept within the question, the resulting score for that concept will not adversely affect the overall score. Additionally, when a candidate answer is evaluated at runtime, each concept within the candidate answer is given a score based on how well it matches to similar concepts in the question. The QA application 112 may then employ the machine learning to filter out concept noise. If the concept ML model weight for a particular concept is greater than a predefined noise threshold, then the QA application 112 keeps the concept, regardless of the concept matching score, as the concept has been determined to be relevant for answering this type of question. In addition, the QA application 112 compares the computed concept matching score to the concept noise threshold on a question by question basis.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer program product, comprising:
a non-transitory computer-readable storage medium having computer-readable program code embodied therewith, the computer-readable program code comprising:
computer-readable program code configured to compute a concept score for a first concept in a first case, wherein the concept score is based on whether the first concept is present in at least one of a candidate answer and an item of supporting evidence;
computer-readable program code configured to adjust the concept score based on a coefficient for the first concept in a machine learning concept model for the first concept, wherein the coefficient reflects a relevance of the first concept in generating a correct response to the first case;
computer-readable program code configured to exclude the first concept from consideration when analyzing the candidate answer and the item of supporting evidence to generate a response to the first case upon determining at least one of: (i) that the adjusted concept score does not exceed a predefined minimum weight threshold and (ii) that the coefficient does not exceed a predefined noise threshold; and
computer-readable program code configured to consider the first concept when analyzing the candidate answer and the item of supporting evidence to generate the response to the first case upon determining at least one of the concept score and the coefficient exceeds a predefined maximum weight threshold.

2. The computer program product of claim 1, further comprising:
computer-readable program code configured to compute a plurality of concept matching scores for a plurality of concepts in the candidate answer based on a respective coefficient for each concept specified by the machine learning concept model; and
computer-readable program code configured to aggregate the plurality of computed concept matching scores into a single relevancy score, wherein the single relevancy score is used to generate a response to the first case.

3. The computer program product of claim 1, further comprising computer-readable program code configured to train the deep question answering system to generate the machine learning concept model, wherein the computer-readable program code configured to train the deep question answering system comprises:
computer-readable program code configured to provide the deep question answering system with a sample case and a sample answer;
computer-readable program code configured to identify the first concept in the sample case;
computer-readable program code configured to compute the concept matching score for the first concept in the sample case based on the sample answer; and
computer-readable program code configured to include the concept matching score in the machine learning concept model.

4. The computer program product of claim 3, wherein producing the machine learning concept model further comprises identifying a type of question included in the sample case, wherein the type of question includes the first concept, wherein the concept matching score is based a degree of relevancy for the first concept and the type of question.

5. The computer program product of claim 1, further comprising:

computer-readable program code configured to generate, based on the first concept score, a response to the first case.

6. The computer program product of claim 1, wherein the concept score is further computed based on the presence of a relationship between the first concept in the first case and a second concept in the in the candidate answer.

7. The computer program product of claim 1, further comprising:
computer-readable program code configured to detect the first concept in the case.

8. The computer program product of claim 1, wherein the first concept is stored in an ontology comprising a plurality of concepts and concept relationships.

9. A system, comprising:
one or more computer processors; and
a memory containing a program, which, when executed by the one or more computer processors, performs an operation comprising:
computing a concept score for a first concept in a first case, wherein the concept score is based on whether the first concept is present in at least one of a candidate answer and an item of supporting evidence;
adjusting the concept score based on a coefficient for the first concept in a machine learning concept model for the first concept, wherein the coefficient reflects a relevance of the first concept in generating a correct response to the first case;
excluding the first concept from consideration when analyzing the candidate answer and the item of supporting evidence to generate a response to the first case upon determining at least one of: (i) that the adjusted concept score does not exceed a predefined minimum weight threshold and (ii) that the coefficient does not exceed a predefined noise threshold; and
considering the first concept when analyzing the candidate answer and the item of supporting evidence to generate the response to the first case upon determining at least one of the concept score and the coefficient exceeds a predefined maximum weight threshold.

10. The system of claim 9, the operation further comprising:
computing a plurality of concept matching scores for a plurality of concepts in the candidate answer based on a respective weight factor specified by the machine learning concept model; and
aggregating the plurality of computed concept matching scores into a single relevancy score, wherein the single relevancy score is used to generate a response to the first case.

11. The system of claim 9, the operation further comprising training the deep question answering system to generate the machine learning concept model, wherein training the deep question answering system comprises:
providing the deep question answering system with a sample case and a sample answer;
identifying the first concept in the sample case;
computing the concept matching score for the first concept in the sample case based on the sample answer; and
including the concept matching score in the machine learning concept model.

12. The system of claim 11, wherein producing the machine learning concept model further comprises identifying a type of question included in the sample case, wherein the type of question includes the first concept, wherein the concept matching score is based a degree of relevancy for the first concept and the type of question.

13. The system of claim 9, the operation further comprising generating, based on the first concept score, a response to the first case.

14. The system of claim 9, wherein the concept score is further computed based on the presence of a relationship between the first concept in the first case and a second concept in the in the candidate answer.

15. The system of claim 9, the operation further comprising detecting the first concept in the case.

16. The system of claim 9, wherein the first concept is stored in an ontology comprising a plurality of concepts and concept relationships.

\* \* \* \* \*